June 15, 1937.  E. A. GUBISCH  2,083,600
MAGNIFYING SYSTEM
Filed April 19, 1935   2 Sheets-Sheet 1

INVENTOR
ERWIN A. GUBISCH
BY
ATTORNEY

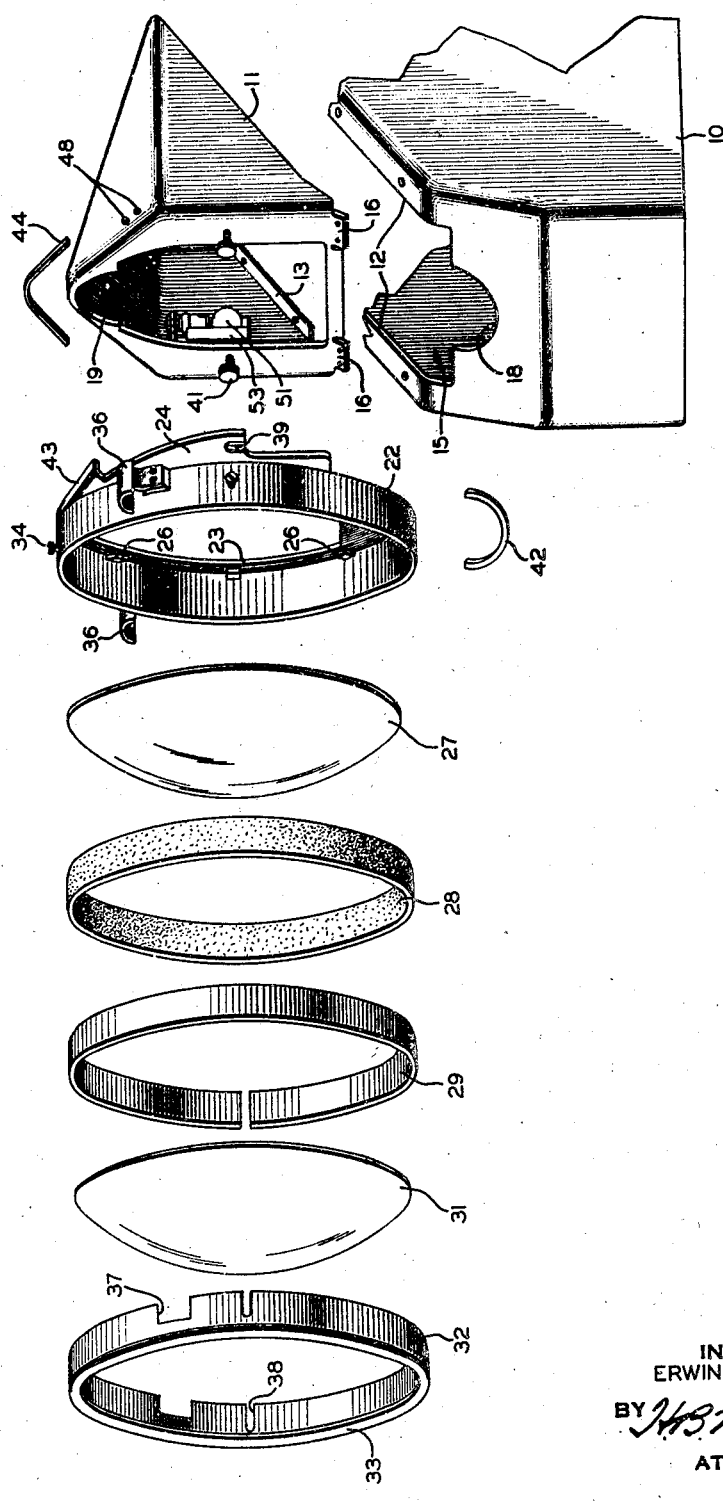

Patented June 15, 1937

2,083,600

UNITED STATES PATENT OFFICE 2,083,600

MAGNIFYING SYSTEM

Erwin A. Gubisch, Chicago, Ill., assignor to Teletype Corporation, Chicago, Ill., a corporation of Delaware Application April 19, 1935, Serial No. 17,172

5 Claims. (Cl. 88—24)

This invention relates to printing telegraph apparatus and particularly to lens magnification systems as applied thereto.

The use of automatically operated printers for the publication of news or other bulletins, or for stock market quotations and many other kinds of intelligence which is or may be of interest to a plurality of persons simultaneously has created a need of increasing the distance at which copy printed with type of a size such as, for example, that employed in the ordinary typewriter, may be legible.

Accordingly, the object of the invention is the production of a clear, substantially undistorted, distantly visible image of a substantial area of page printed copy by uniform magnification thereof.

The simple and obvious solution of a problem involving the production of an enlarged image of an object is the employment of a single, simple converging lens such as a double convex or plano-convex lens. Such a lens produces a clear and undistorted image of an object that is very small in comparison with the diameter of the lens, and that is positioned on the optical axis of the lens. However, when the object is of a substantial size relative to the diameter of the lens, a single lens, introduces certain undesirable conditions. It is desirable, in magnifying the copy produced by a printer of the type disclosed herein, which prints in lines upon a page, to produce an enlarged image of several lines of printed matter, each line of which is several inches in length. For example, in one embodiment of the invention an area of printed copy has been magnified to twice its length and width, so that an area of copy three inches square produces an image six inches square.

A single lens large enough to accommodate the desired area of copy and possessing the desired magnifying power would be very thick and heavy. Such a lens would introduce considerable distortion, especially near the edge thereof, because of the magnitude of the angle between the two surfaces of the lens. As is well known, the ideal lens, capable of magnifying without distortion, is of negligible thickness, in which case the maximum angle between its two surfaces is very small. With such a lens, a ray of light from an object would have substantially the same angular disposition with respect to both surfaces of the lens, which is the theoretically ideal situation.

The preferred embodiment of the present invention avoids the disadvantages of a single large thick lens by employing a system composed of a plurality of thin lenses which, in combination, produce the desired magnification. The lenses are preferably of the concavo-convex or meniscus type having one surface convex and the other surface concave, the concave surface having the greater radius, so that the lens is thinnest at its edge. The meniscus lens permits smaller angular differences between the two surfaces than do the double convex or plano-convex lenses, and therefore less distortion is experienced than with lenses of the same power in other types. This lens also exhibits greater freedom from surface reflections than other types of lenses. It follows from this that with a lens system composed of a plurality of meniscus lenses, an observer need not be positioned on the optical axis of the lens system in order to see a substantially undistorted image of the area which the system is capable of magnifying, but several persons may be grouped in front of the lens system at a distance of several feet therefrom, and they may simultaneously observe material which has been or is being printed.

The lens system which has exhibited notable utility for rendering copy produced by a telegraphically operated printer visible to a plurality of persons simultaneously consists of a pair of meniscus lenses supported in front of the paper as it appears above the printing platen. The support for the lenses consists of a cylindrical frame detachably secured to a hood carried by the housing of a printer.

A full and complete understanding of the invention may be had from the following description, taken in conjunction with the accompanying drawings, wherein:

Fig. 4 is an exploded view in perspective, showing the order of assembly of the elements of the magnifying system.

Figure 1:
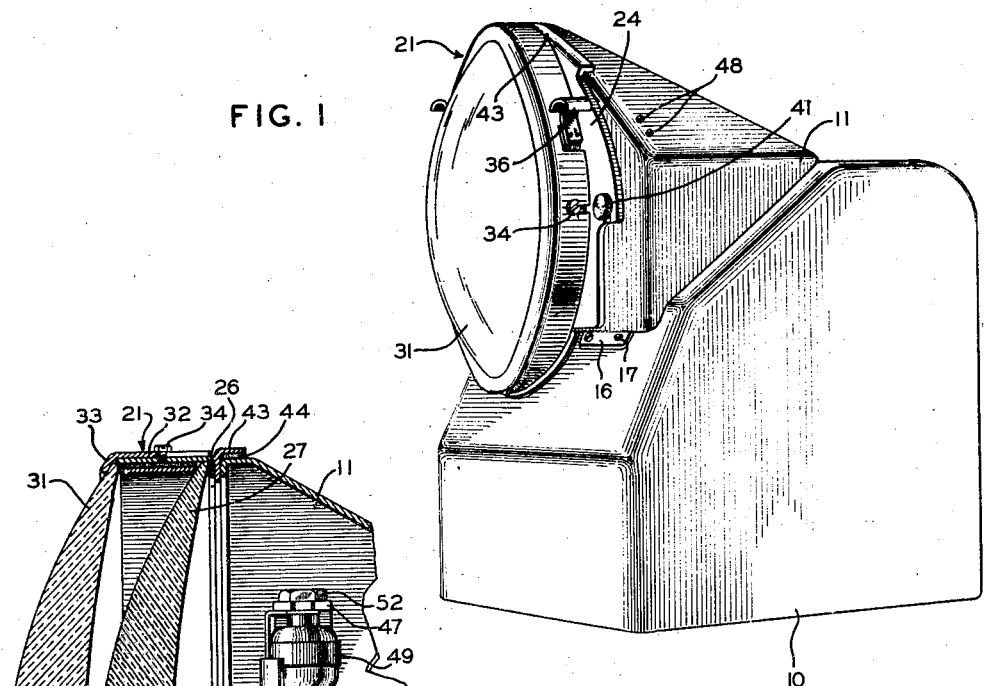
Fig. 1 is a perspective view of a printing telegraph apparatus showing a magnifying system according to the invention applied to the housing thereof.

Referring now to the drawings, in which like reference characters designate corresponding portions throughout the several figures, and particularly to Figs. 1 and 4, the reference numeral 10 designates a housing or cover for a telegraphically operated printer or other automatic printing device. An example of a printing mechanism which is capable of being housed in the cover 10 is disclosed in U. S. Patent 1,904,164 granted April 18, 1933 to S. Morton et al. to which reference may be had for an understanding of the structure and operation of such printing mechanism.

The cover 10, which has an observation aperture 15 through which printed copy may be observed, receives and detachably supports over the aperture 15, a hood 11 which is conformed to the forward upper portion of the cover 10 so as to rest thereon and to have its front portion preferably disposed in a substantially vertical alignment. The cover 10 and hood 11 are provided with inwardly turned cooperating flanges 12 and 13 respectively through which bolts 14 or other convenient securing means are passed to secure the hood to the cover. The hood 11 is also provided at the front thereof with depending lugs 16 through apertures of which bolts 17 extend and engage the cover 10 to additionally secure the hood 11 to cover 10. The cover 10 is provided with a clearance 18 for receiving a portion of a lens assembly which will be described hereinafter. The hood 11 is provided with an aperture 19 in the front thereof to permit the transmission of light from the interior of the hood through the lens system.

Figure 2:
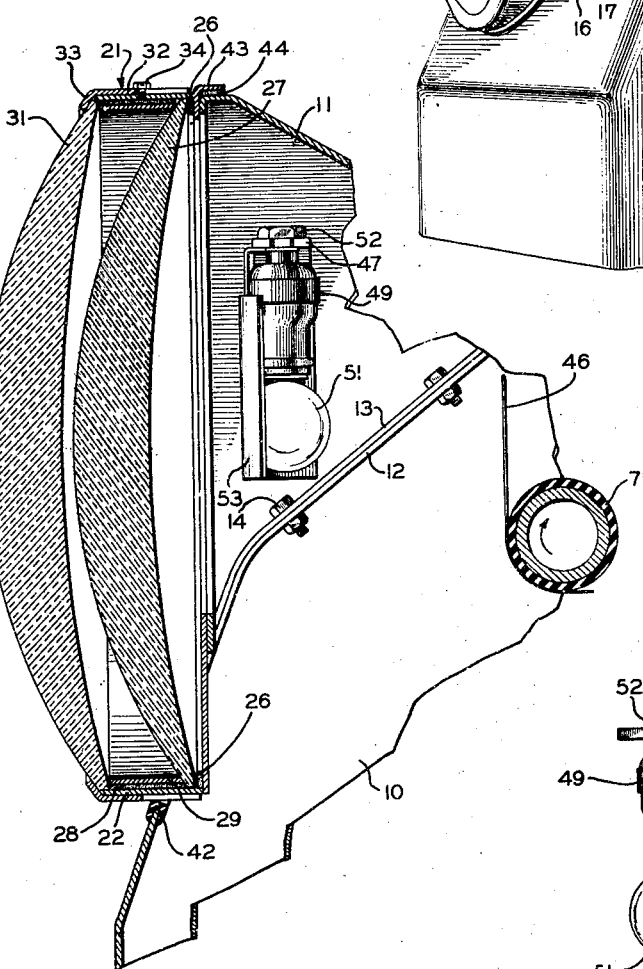
Fig. 2 is a sectional view through the magnifying system.
Figure 3:
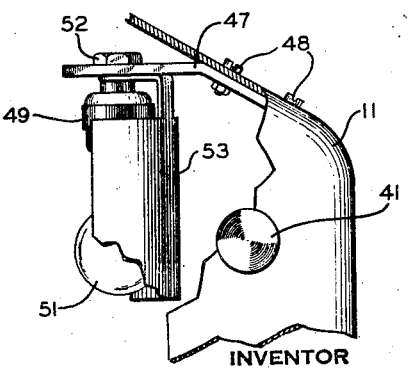
Fig. 3 is a detail view showing the mounting of an illuminating element.

The hereinbefore mentioned lens assembly is indicated generally by the reference character 21, and the elements of which the assembly consists are shown in detail in Figs. 2 and 4, to which attention is now directed.

The foundation of the lens assembly is a cylindrical member or ring 22 provided with an inwardly extending flange 23 and oppositely directed, outwardly extending ears 24 by means of which the foundation member may be supported. The cylindrical foundation member receives cushioning pads 26 of any desired resilient material such, for example, as felt, which are disposed in abutting relation with the inwardly turned flange 23. The cylindrical foundation member 22 next receives a lens 27 which rests against the cushioning pads 26 and is retained in the cylindrical member by the flange 23. After the lens 27 has been positioned, a cushioning band 28, which may be of the same material of which the cushioning pads 23 are composed or of any other desired resilient material, is placed in the foundation member 22 to conform to the cylindrical inside wall thereof, after which a spacer ring 29 is placed inside the resilient band 28. The spacer ring 29 maintains the resilient band 28 circumferentially in the desired position, and, in addition, it spaces the outer lens 31 from the inner lens 27 so as to provide the proper optical relation between the lenses. The outer lens 31 rests against the resilient band 28 and the spacer ring 29, and when it has been so positioned, a clamping or retaining ring 32 is applied to the foundation member 22 to retain the annular cushioning member 26, cushioning band 28, spacer ring 29, and lenses 27 and 31 in the desired position. The retaining member 32 is cylindrical in contour and is of sufficient inside diameter to snugly engage the outer cylindrical surface of the foundation member 22. The retaining member 32 is provided with an inwardly extending flange 33 at the front thereof against which the outer lens 31 is disposed, and which thereby retains the elements bearing the reference characters 26 to 29 inclusive, and 31 within the foundation member 22.

The foundation member 22 is provided with screws 34, or other suitable securing means disposed in spaced relation around the periphery thereof, and the clamping ring 32 is provided with slots 38 in which screws 34 are disposed when the retainer 32 is applied to the foundation member 22. The slots 38 permit the retainer 32 to be placed upon and removed from the foundation member 22 without the removal of the screws 34, and the heads of the screws 34 may be drawn down against the outer surface of the retainer 32 to firmly secure the elements together and to prevent the accidental displacement of any of the elements which enter into the assembly. The foundation member 22 has hand grips 36 permanently secured thereto in any desired manner, such as by screws, for facilitating the handling of the assembly, and the clamping ring 32 is provided with recesses 37 for clearing the handles 36.

The ears 24 of the foundation member 22 are provided at their lower edges with slots 39 which are adapted to fit over the shanks of headed screws 41 carried by the hood 11, whereby the entire lens assembly 21 may be rigidly secured to the hood 11. When the assembly 21 is secured to the hood 11, its lower portion enters the arcuate clearance 18 in the cover of housing 10 and an arcuate cushioning member 42 composed of any suitable resilient material, such as soft rubber, may be provided to afford a resilient seat for the lower portion of the assembly 21. The foundation member 22 is provided above the ears 24 with a rearwardly extending flange 43 which is conformed to the configuration of the uppermost front portion of the hood 11. A cushioning member 44 consisting of a strip of felt or other suitable packing material may be interposed between the top of the hood 11 and the underside of the flange 43 when the assembly 21 is secured to the hood 11. With this arrangement the weight of the assembly 21 is supported jointly by the top of the hood 11 and the cushioning member 42 carried in the clearance 18 so that the principal function of the screws 41 is to hold the ears 24 and flange 23 of the foundation member 22 in abutting relation with the face of the hood 11 without being subjected to the strain of supporting the entire weight of the lens assembly 21.

Referring to Fig. 2, the reference numeral 71 indicates the printing platen of an automatic printing apparatus; such as that disclosed in the S. Morton et al. patent referred to above. The direction of rotation of the platen as printing operation takes place is as indicated by the arrow in Fig. 2 so that the web of paper 46 upon which the printed matter appears, moves upwardly behind the lenses 27 and 31. In order that the copy which is to be observed may be illuminated to facilitate the reading thereof, brackets 47 are secured at opposite sides of the hood 11 by any desired means; such as screws 48 for supporting sockets 49 adapted to receive incandescent lamp bulbs 51. The sockets 49 are secured to the brackets 47 by nuts 52, and reflectors 53 are provided for directing light toward the printed copy on the paper 46 and away from the lens system, and for protecting the lenses from the heat emanating from the incandescent lamps.

As shown in Fig. 2, the lenses 27 and 31 are preferably of the meniscus or concavo-convex type, which, as is well known, is a converging lens having a convex surface and a concave surface, the radius of curvature of the convex surface being less than that of the concave surface. The employment of two lenses, each of which furnishes a portion of the total magnification desired, affords a freedom from distortion of the image that is not obtainable with a single converging lens capable of providing the desired magnification. A single lens providing the magnification afforded by the pair of lenses would be very thick. In any spherical lens the deviation of rays of light traversing the lens increases as the distance between the object from which the rays emanate and the optical axis of the lens increases. Distortion of an image results from such deviation of rays, and the distortion increases as the deviation increases. The rate of increase of deviation of rays is much higher in thick lenses than in thin lenses. Also, the rate of increase of deviation is lower in meniscus lenses than in all other types of converging lenses possessing the same magnifying power. It follows from this that a pair of relatively thin lenses, each of which contributes to the desired magnification, affords far greater fidelity of image than would a single lens providing the same magnification. The lens system hereinbefore described affords, by reason of its relative freedom from distortion, a greater angle of visibility than could be obtained with any single lens or with a pair of lenses of any other type than that herein disclosed. It was found that a pair of meniscus lenses capable of magnifying a three-inch square area of printed copy to produce an image six inches square, rendered the printed copy legible to normal vision at a distance of approximately ten feet, and the copy remained visible and legible as the observer moved laterally from the vertical plane of the optical axis of the lens system a distance of several degrees. The transverse distance through which the copy was legible accommodated several observers simultaneously. Furthermore, the system provided substantially uniform magnification at any point between three and ten feet from the lens system. In the embodiment of the invention which exhibited the properties outlined above, the power of the lens system was calculated so that the common focal point of the lenses was situated beyond the position of the printed copy. This arrangement contributed to the uniformity of magnification.

It is to be understood that the present invention is not to be interpreted as limited to the specific embodiment shown in the drawings and described in the foregoing specification, but that it is capable of modification, substitution, and rearrangement of parts and the combinations thereof, within the scope of the appended claims.

What is claimed is:

1. In a printing telegraph apparatus having a printing platen adapted to deliver printed matter in page form into observable position character by character, a cover for said apparatus having an observation aperture in registry with said observable position, a hood positioned over said aperture, a lens holder carried by the hood having a lip resting on the top of the hood and having its lower portion supported by the cover, and a plurality of converging lenses coaxially supported by said holder for producing an observable enlarged virtual image of a substantial portion of said printed matter.

2. In a printing mechanism, having a printing platen adapted to advance printed copy into observable position, a cover for the printing mechanism, a hood removably carried by the cover, a cylindrical member removably carried by the hood, a pair of lenses disposed within the cylindrical member, a spacing member disposed between the lenses, resilient cushioning means associated with the lenses, a lens retaining ring associated with the cylindrical member, and means carried by the hood interiorly thereof for illuminating printed copy.

3. In a printing apparatus having a printing platen adapted to deliver printed copy into a position for direct observation, a cover for said apparatus having a sloping forward portion provided with an aperture in registration with said observation position, a hood detachably mounted on said sloping forward portion having a substantially vertical forward wall provided with an aperture in registration with said observation position, and a system of magnifying lenses removably carried by said hood over its aperture at a distance from said platen less than the focal length of said lens system.

4. In a printing telegraph apparatus having a printing platen adapted to deliver printed matter in page form into observable position, a cover for said apparatus having an aperture in the forward wall thereof, a hood mounted on the cover over the upper portion of said aperture, a lens holder mounted on the forward wall of said hood, said lens holder having an outwardly turned flange at the top thereof supported by said hood, and having the lower portion thereof supported by the lower edge of said aperture, and a plurality of converging lenses supported within said lens holder for producing an enlarged virtual image of a substantial portion of said printed matter.

5. In a printing telegraph apparatus having a printing platen adapted to deliver printed matter in page form into observable position character by character, a cover for said apparatus having an aperture in the forward wall thereof, a cushioning member supported by the lower edge of said aperture, a hood mounted on the cover over the upper portion of said aperture, a plurality of clamping screws threadedly engaging the front of said hood, a lens holder having notched ears engaged by said screws and having a laterally extending flange supported by the top of said hood, said lens holder resting upon said cushioning member, and a plurality of magnifying lenses supported within said lens holder for producing an enlarged virtual image of a substantial portion of said printed matter.

ERWIN A. GUBISCH.